(12) United States Patent
Ohki et al.

(10) Patent No.: US 6,333,914 B1
(45) Date of Patent: Dec. 25, 2001

(54) OPTICAL RECORDING MEDIUM AND METHOD OF MANUFACTURING SAME

(75) Inventors: Hiroshi Ohki, Kanagawa; Toshiyuki Kashiwagi, Tokyo, both of (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/499,749

(22) Filed: Feb. 8, 2000

Related U.S. Application Data

(62) Division of application No. 08/605,362, filed on Feb. 22, 1996, now Pat. No. 6,111,851.

(30) Foreign Application Priority Data

Feb. 27, 1995 (JP) .................................................. 7-038628

(51) Int. Cl.⁷ .................................................. G11B 3/70
(52) U.S. Cl. .................................................. 369/286
(58) Field of Search .................................................. 369/286

(56) References Cited

U.S. PATENT DOCUMENTS 5,244,775  9/1993  Miwa .

FOREIGN PATENT DOCUMENTS

| 0 437 223 | 7/1991 | (EP) . |
| 0 658 885 A1 | 6/1995 | (EP) . |
| 0706178 A2 | 4/1996 | (EP) . |
| 0 720 159 A2 | 7/1996 | (EP) . |
| 2 017 379 | 10/1979 | (GB) . |

*Primary Examiner*—Allen Cao
(74) *Attorney, Agent, or Firm*—Ronald P. Kananen; Rader, Fishman & Grauer PLLC

(57) ABSTRACT

An optical recording medium includes a first recording member having a first light-transmissive substrate and a first semi-light-transmissive information area disposed on a surface of the first light-transmissive substrate, and a second recording member having a second substrate and a second reflective information area disposed on a surface of the second substrate. The first recording member and the second recording member are joined to each other with the transparent layer interposed therebetween with the first and second information areas facing each other.

13 Claims, 4 Drawing Sheets

_US 6,333,914 B1_

OPTICAL RECORDING MEDIUM AND METHOD OF MANUFACTURING SAME

This application is a divisional of application Ser. No. 08/605,362 filed Feb. 22, 1996, now U.S. Pat. No. 6,111,851.

BACKGROUND OF THE INVENTION

1. Field of the Invention

The present invention relates to an optical recording medium and a method of manufacturing such an optical recording medium.

2. Description of the Related Art

There have been known optical recording mediums such as optical disks, cards, etc. for recording and/or information such as audio information, video information, etc. with the application of light. It has been proposed to increase the amount of information that can be recorded on an optical recording medium by employing an information recording surface thereof which is of a multilayer structure.

One such proposal is illustrated in FIG. 1 of the accompanying drawings. As shown in FIG. 1, an optical disk has a pair of first and second recording members 1, 2 which comprises respective transparent substrates 1S, 2S, respective information areas 1M, 2M disposed on respective surfaces of the transparent substrates 1S, 2S and carrying recorded information in the form of information pits, and respective reflecting surfaces 1R, 2R of evaporated aluminum, for example, disposed respectively on the information areas 1M, 2M. The first and second recording members 1, 2 are bonded to each other by an adhesive 3 with the information areas 1M, 2M facing each other.

For reading or reproducing recorded information from the information areas 1M, 2M, reading light (hereinafter referred to as reproducing light) 1L is applied to the information area 1M through the transparent substrate 1S, and reproducing light 2L is applied to the information area 2M through the transparent substrate 2S. Therefore, a drive unit for use with the optical disk has a double optical pickup structure including two playback optical pickups positioned in confronting relationship to the opposite surfaces of the optical recording medium for applying reproducing light to the respective information areas 1M, 2M, or alternatively, a single optical pickup for applying reproducing light to the information areas 1M, 2M which have selectively been brought into facing relationship to the optical pickup by reversing the optical disk.

The drive unit of the double optical pickup structure is large in size, made up of a large number of parts, and heavy in weight. The drive unit with the single optical pickup needs a complex mechanism for automatically reversing the optical disk in order to successively reproduce recorded information from the information areas 1M, 2M. Therefore, the drive unit with the single optical pickup is also large in size, made up of a large number of parts, and heavy in weight.

To avoid the above difficulties, there has been proposed an optical recording medium capable of reproducing information recorded on two-layered information recording areas with light applied from one side of the optical recording medium. The optical recording medium and a method of manufacturing same will be described below with reference to FIGS. 2A through 2D of the accompanying drawings.

As shown in FIG. 2A, a first transparent substrate 21S is injection-molded of polycarbonate (hereinafter referred to as "PC") which has a first information area 21M comprising information pits representative of recorded information. Then, as shown in FIG. 2B, a semitransparent optical layer 23, for example, a sputtered layer of SiN, is formed on the first information area 21M for controlling the transmittance and reflectance in the first information area 1M at desired values. Thereafter, a second information area is formed of an ultraviolet-curing resin on the semitransparent optical layer 23 by a photopolymerization process, e.g., a so-called 2P process. More specifically, as shown in FIG. 2C, a stamper 25 having a pattern of convex and concave shapes for forming a second information area is pressed against the semitransparent optical layer 23 through an ultraviolet-curing resin 24, and then the ultraviolet-curing resin 24 is cured by an ultraviolet radiation applied from the side of the first transparent substrate 21S. Thereafter, as shown in FIG. 2D, the stamper 25 is removed, leaving a second information area 22M, transferred from the pattern of convex and concave shapes of the stamper 25, on the ultraviolet-curing resin 24. A reflecting film 26 of evaporated aluminum or the like is deposited on the second information area 22M, and then covered with a protective layer 27 of a photosetting resin or the like. In this manner, the optical recording medium with the first and second information areas 21M, 22M is manufactured.

For reproducing information recorded on the optical recording medium with light, the light is applied to the optical recording medium from the side of the transparent substrate 21S. More specifically, as shown in FIG. 2D, to reproduce recorded information from the first information area 21M, reproducing light 21L which is focused on the first information area 21M is applied from the side of the transparent substrate 21S, and light reflected by the first information area 21M is detected to read the information. To reproduce recorded information from the second information area 22M, reproducing light 22L which is focused on the second information area 22M is applied from the side of the transparent substrate 21S, and light reflected by the second information area 22M is detected to read the information.

Since the information recorded on the first and second information areas 21M, 22M can be reproduced with light applied from one side, a drive unit for use with the optical-recording medium may have a single optical pickup. As the optical recording medium does not need to be reversed, the drive unit may be small in size, light in weight, simple in structure, and easy to assemble. However, because the information area 22M is formed by the 2P process, the optical recording medium is required to be formed in layers, and cannot be mass-produced efficiently.

SUMMARY OF THE INVENTION

It is therefore an object of the present invention to provide an optical recording medium which allows information to be reproduced from and/or recorded on a plurality of layered information areas with light applied from one side of the optical recording medium, permits a drive unit for the optical recording medium to have a single optical pickup without the need for reversal of the optical recording medium, and can be mass-produced highly efficiently.

According to the present invention, there is provided an optical recording medium comprising a first recording member having a first light-transmissive substrate and a first semi-light-transmissive information area disposed on a surface of the first light-transmissive substrate, a second recording member having a second substrate and a second reflective information area disposed on a surface of the second substrate, and a transparent layer, the first recording member and the second recording member being joined to each other with the transparent layer interposed therebetween with the first and second information areas facing each other.

According to the present invention, there is also provided a method of manufacturing an optical recording medium, comprising the steps of separately fabricating a first recording member having a first light-transmissive substrate and a first semi-light-transmissive information area disposed on a surface of the first light-transmissive substrate, and a second recording member having a second substrate and a second reflective information area disposed on a surface of the second substrate, and joining the first recording member and the second recording member to each other with a transparent layer interposed therebetween with the first and second information areas facing each other.

The terms "light-transmissive", "semi-light-transmissive", "reflective", and "transparent" used herein are intended to signify the properties capable of transmitting, partly transmitting, reflecting, and passing light that is applied to optically reproduce information from and record information on the optical recording medium.

With the arrangement of the present invention, the first recording member with the first information area and the second recording member with the second information area are fabricated separately from each other and then joined to each other, resulting in a laminated structure of the first and second information areas. Since the first information area is semi-light-transmissive and the second information area is reflective, information can be recorded on and/or reproduced from the first and second information areas with light which is applied from the side of the first information area.

DETAILED DESCRIPTION OF THE PREFERRED EMBODIMENT

The principles of the present invention are applied to an optical recording medium such as an optical disk, a card, etc. for recording and/or reproducing information such as audio information, video information, etc. with the application of light.

Figure 1:
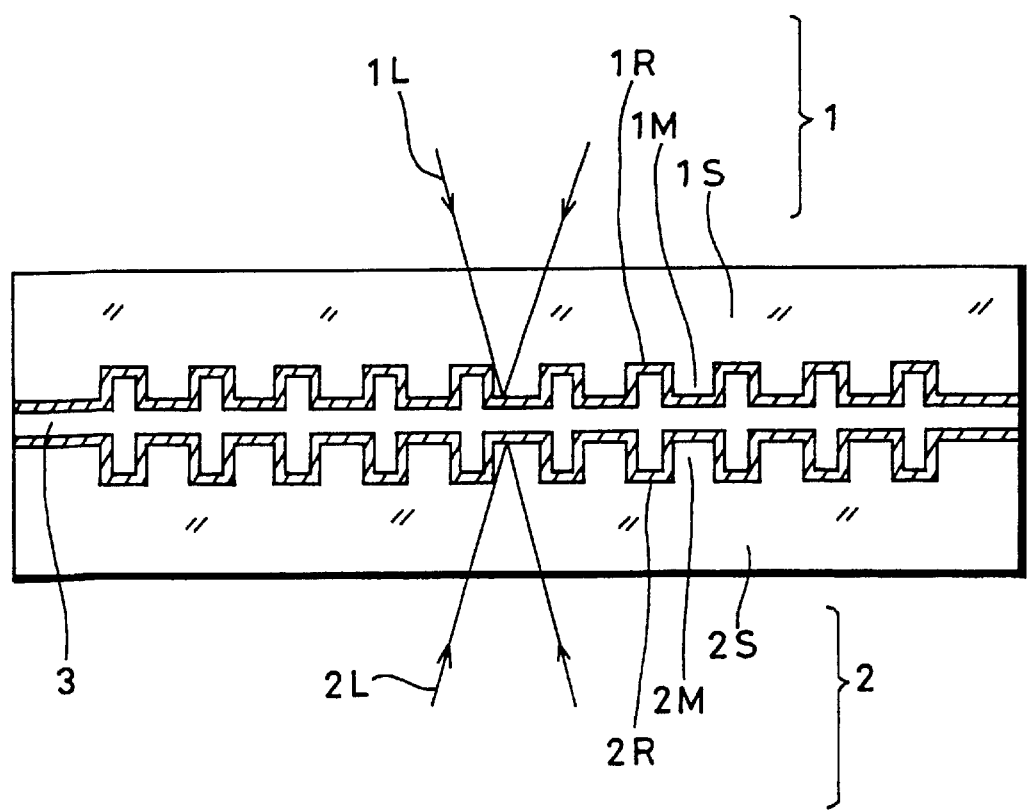
FIG. 1 is a cross-sectional view of a conventional optical recording medium.
Figure 2:
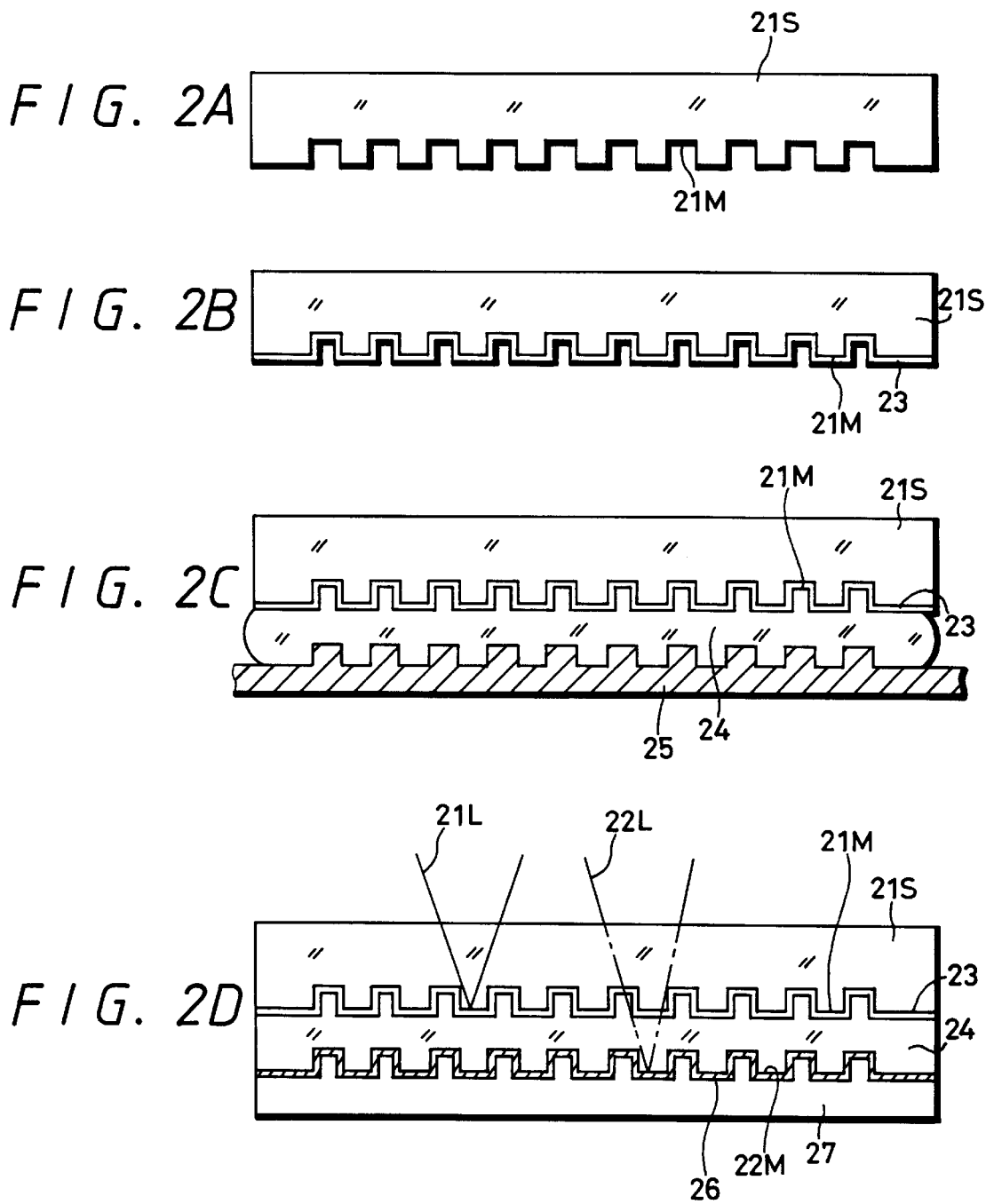
FIGS. 2A through 2D are cross-sectional views showing a process of manufacturing the conventional optical recording medium.
Figure 3:
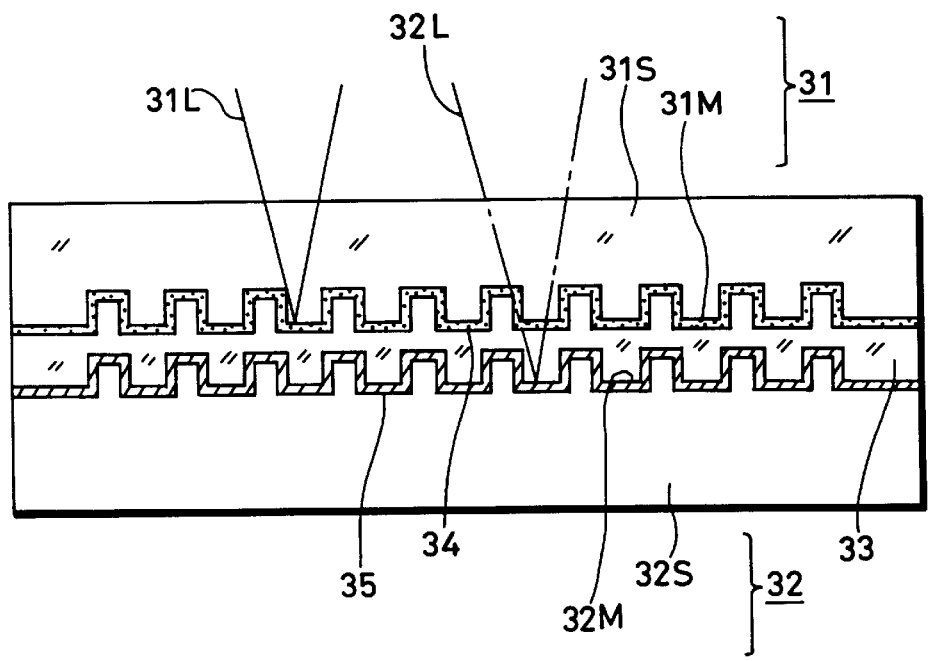
FIG. 3 is a cross-sectional view of an optical recording medium according to the present invention.

FIG. 3 shows in cross section an optical disk, to which the present invention is applied, of the ROM(read-only memory)-type having information areas comprising pits in a pattern of convex and concave shapes representative of information that can be read by the application of light thereto.

Figure 4:
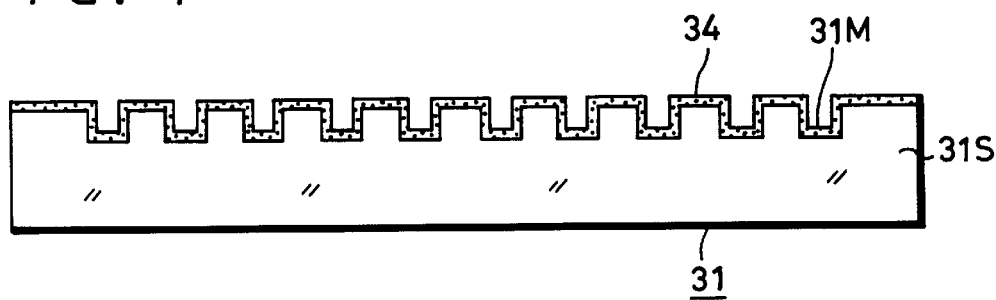
FIG. 4 is a cross-sectional view of a first recording member of the optical recording medium according to the present invention.
Figure 5:
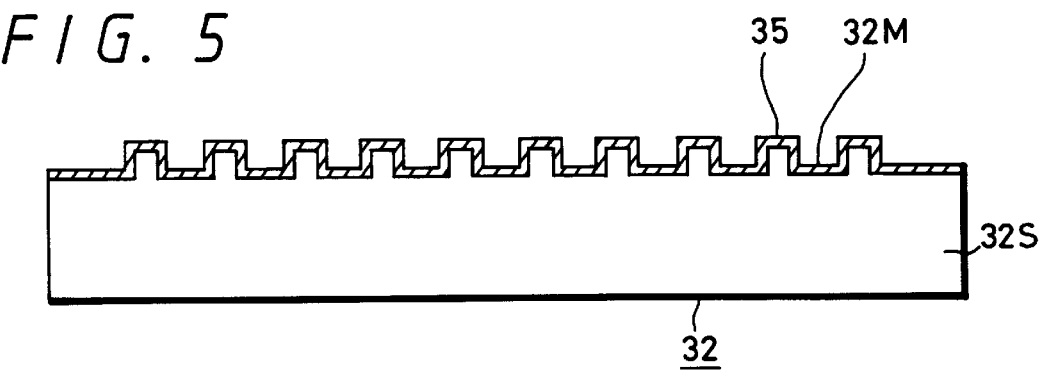
FIG. 5 is a cross-sectional view of a second recording member of the optical recording medium according to the present invention.

The optical recording medium or disk according to the present invention comprises a first recording member 31 having a first light-transmissive substrate 31S which supports on one surface thereof a first semi-light-transmissive information area 31M, as shown in FIG. 4, and a second recording member 32 having a second substrate 32S which supports on one surface thereof a second reflective information area 32M, as shown in FIG. 5. The first and second members 31, 32 are joined to each other by a transparent layer 33 with the first and second information areas 31M, 32M confronting each other.

Reproducing light 31L, 32L for reading information recorded by pits on the first and second information areas 31M, 32M as shown in FIG. 3 is applied to the optical recording medium or disk from a surface of the first recording member 31 opposite to the first information area 31M, i.e., a back surface of the first recording member 31.

The first information area 31M, which is semi-light-transmissive, has a reflectance ranging from 20% to 50% and a transmittance ranging from 30% to 80%.

The second information area 32M, which is reflective, has a reflectance of 60% or more.

Figure 6A:
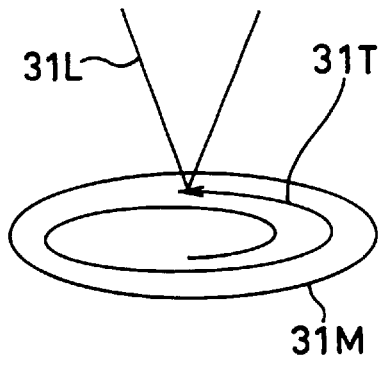
FIGS. 6A and 6B are diagrams illustrative of directions in which recording progresses on respective information areas of the optical recording medium according to the present invention.
Figure 6B:
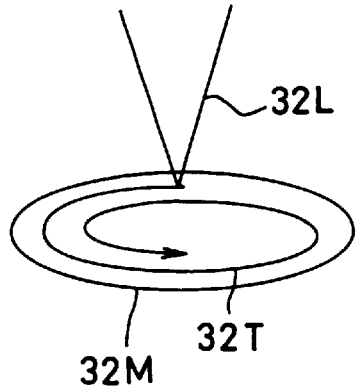

The first and second information areas 31M, 32M have respective recording tracks 31T, 32T (see FIGS. 6A, 6B) arranged coaxially with each other. As shown in FIGS. 6A and 6B, recording progresses in the first and second information areas 31M, 32M, as they rotate, in the same direction indicated by the arrows as viewed from the side from which the reproducing light is applied.

As shown in FIG. 6A, the recording track 31T of the first information area 31M extends progressively radially outwardly along the direction in which recording progresses as indicated by the arrow. As shown in FIG. 6B, the recording track 32T of the second information area 32M extends progressively radially inwardly along the direction in which recording progresses as indicated by the arrow.

The optical recording medium or disk according to the present invention is manufactured as follows: The first recording member 31 with the first light-transmissive substrate 31S supporting on one surface thereof the first semi-light-transmissive information area 31M, as shown in FIG. 4, and the second recording member 32 with the second substrate 32S supporting on one surface thereof the second reflective information area 32M, as shown in FIG. 5, are fabricated separately from each other.

Figure 7:
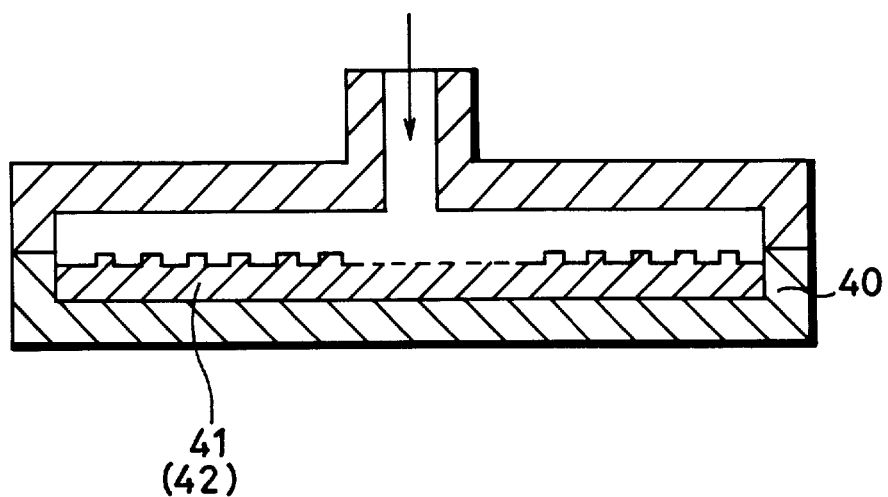
FIG. 7 is a cross-sectional view of an injection-molding mold used in a process of manufacturing the optical recording medium according to the present invention.

If the information areas 31M, 32M comprise pits representing recorded information, as shown in FIG. 3, then the first and second recording members 31, 32 are injection-molded of a transparent resin such as PC or the like by a mold 40 (see FIG. 7). For injection-molding the first recording member 31, a master stamper 41 having a pattern of convex and concave shapes for forming the first information area 31M is placed in the cavity of the mold 40, and a transparent resin such as PC, for example, in a molten state is injected into the cavity. For injection-molding the first recording member 31, a master stamper 42 having a pattern of convex and concave shapes for forming the second information area 32M is placed in the cavity of the mold 40, and a transparent resin such as PC, for example, in a molten state is injected into the cavity.

The pattern of convex and concave shapes on one of the master stampers 41, 42 represents information recorded successively radially outwardly from its center in either a clockwise or counterclockwise direction around the center, and the pattern of convex and concave shapes on the other of the master stampers 41, 42 represents information recorded successively radially inwardly toward its center in either a counterclockwise or clockwise direction around the center.

The master stampers 41, 42 may be fabricated in a known manner. Specifically, a glass substrate having a mirror surface, for example, is coated with a photoresist, which is then exposed to a pattern image by a laser beam which has been modulated, e.g., turned on and off, with information to be recorded, while the laser beam is being rotated relatively to the glass substrate and moved radially relatively to the glass substrate to scan the same. Thereafter, the pattern image on the photoresist is developed into a pattern of convex and concave shapes, which is then plated with a metal, such as silver, thereby forming a disk master. The disk master is plated with a metal such as nickel, forming a metal mask having a pattern of convex and concave shapes that is a reversal of the pattern of convex and concave shapes on the disk master. The pattern of convex and concave shapes on the metal mask is then plated with a metal such as nickel, forming a mother having a pattern of convex and concave shapes that is a reversal of the pattern of convex and concave shapes on the metal mask. The mother is similarly plated, forming the master stampers 41, 42 having a pattern of convex and concave shapes that is a reversal of the pattern of convex and concave shapes on the mother.

When the photoresist on the glass substrate for the formation of one of the master stampers 41, 42 is exposed to a pattern image by a laser beam modulated with information to be recorded, the laser beam is applied to the photoresist successively radially outwardly from its center in either a clockwise direction, for example, around the center. When the photoresist on the glass substrate for the formation of the other of the master stampers 41, 42 is exposed to a pattern image by a laser beam modulated with information to be recorded, the laser beam is applied to the photoresist successively radially inwardly toward its center in either a counterclockwise direction, for example, around the center.

Using the master stampers 41, 42 thus fabricated, the first transparent substrate 31 with the first information area 31M thereon and the second transparent substrate 32 with the second information area 32M thereon are injection-molded.

As shown in FIG. 4, a semitransparent film 34 of SiN, SiO$_2$, or the like is deposited to a thickness of 150 Å on the first information area 31M by evaporation, sputtering, or the like. The semitransparent film 34 thus deposited makes the first information area 31M semi-light-transmissive, having a reflectance ranging from 20% to 50% and a transmittance ranging from 30% to 80%, as described above.

As shown in FIG. 5, a film 35 of aluminum or the like is deposited to a thickness of 500 Å on the second information area 32M by evaporation or the like. The film 35 thus deposited makes the second information area 32M reflective, having a reflectance of 60% or more, as described above.

The transparent substrates 31S, 32S are joined to each other by the transparent layer 33 interposed therebetween with the first and second information areas 31M, 32M confronting each other. The transparent layer 33 may be made of a photosetting transparent resin, e.g., an ultraviolet-curing transparent resin, which may be placed and pressed between the transparent substrates 31S, 32S and then cured by light, e.g., a ultraviolet radiation, applied from the side of the first transparent substrate 31S. The first transparent substrate 31S and the first information area 31M are transmissive or semi-transmissive with respect to the ultraviolet radiation that is applied to cure the ultraviolet-curing transparent resin.

The distance between the first and second information areas 31M, 32M is set to a desired value, such as 40 µm, for example, by the thickness of the transparent layer 33, such that it will not cause an interference in light reflected by the first and second information areas 31M, 32M when reproducing light is applied. The transparent substrates 31S, 32S, i.e., the first and second recording members 31, 32, are now joined to each other, thus producing the optical recording medium or disk.

With the optical recording medium or disk thus finally manufactured, the recording tracks 31T, 32T on the first and second information areas 31M, 32M are arranged such that recording progresses along the recording tracks 31T, 32T in the same direction as viewed from the side from which the reproducing light is applied, and the recording track 31T extends progressively radially outwardly along the direction in which recording progresses, whereas the recording track 32T extends progressively radially inwardly along the direction in which recording progresses.

The recording tracks 31T, 32T on the first and second information areas 31M, 32M may be of a spiral shape or a concentric ring shape.

The transparent substrates 31S, 32S of the first and second recording members 31, 32 have substantially the same thickness, e.g., of 1.2 mm or 0.6 mm. This thickness is effective in preventing the optical recording medium, which is made up of the joined transparent substrates 31S, 32S, from being warped or otherwise deformed by a thermal expansion or contraction due to the ambient temperature.

The arrangement of the present invention as described above offers various advantages given below. Since the optical recording medium is of a multilayer structure including the first and second information areas 31M, 32M superimposed on each other, the optical recording medium has an increased information storage capability. Inasmuch as the first information area 31M is semi-light-transmissive, it allows reproducing light applied from the same side as reproducing light applied to the first information area 31M to reach the second information area 32M through the first information area 31M, and also allows light reflected from the second information area 32M to be detected through the first information area 31M. Therefore, recorded information can be read based on an interference due to information pits, for example, in the first and second information areas 31M, 32M.

As described above, the first information area 31M has a reflectance ranging from 20% to 50% and a transmittance ranging from 30% to 80%, and the second information area 32M has a reflectance of 60% or more. This substantially equalizes the amount of reading light applied to the first information area 31M to the amount of reading light applied to the second information area 32M. Accordingly, a circuit required for adjusting output powers of information reading light is simplified.

The recording tracks 31T, 32T of the first and second information areas 31M, 32M are arranged coaxially with each other. As viewed from the side from which the reproducing light is applied, recording progresses in the same direction along the recording tracks 31T, 32T of the first and second information areas 31M, 32M. The recording track 31T of the first information area 31M extends progressively radially outwardly along the direction in which recording progresses as indicated by the arrow, whereas the recording track 32T of the second information area 32M extends progressively radially inwardly along the direction in which recording progresses as indicated by the arrow. If each of the recording tracks 31T, 32T is of a spiral shape, then information can be recorded and/or reproduced continuously along the recording tracks 31T, 32T. Therefore, the period of time for which information is continuously recorded and/or reproduced can be increased.

In the above embodiment, the present invention has been described as being embodied in an optical disk in the form of a ROM with each of the first and second information areas 31M, 32M comprising information pits in the form of convex and concave shapes. However, the information areas 31M, 32M are not limited to the illustrated recording configuration. The present invention may be applied to an optical recording medium which allows information to be optically recorded, written once, and rewritten. The information areas 31M, 32M may be arranged such that they allow information to be recorded and reproduced in the same mode as each other or in different modes from each other. For example, the information areas 31M, 32M may be of a phase-change recording arrangement for recording information through changes in optical characteristics based on a phase change between amorphous and crystalline states, or of a magnetooptical recording arrangement.

In the above embodiment, the optical recording medium is constructed of the first and second recording members 31M, 32M which are joined to each other. However, the optical recording medium may be constructed of three or more superimposed recording members.

The optical recording medium and the method of manufacturing same according to the present invention are not limited the optical disk, but may be directed to a card or the like. Therefore, the optical recording medium and the method of manufacturing same according to the present invention are not limited to the illustrated embodiment, but may be modified in various ways.

The optical pickup used herein is not limited to a playback pickup, but should be interpreted to include any device having an optical recording capability.

With the optical recording medium according to the present invention, as described above, since information is recorded on and/or reproduced from a plurality of information areas with light applied from one side of the optical recording medium, the optical recording medium can be used with a single optical pickup, resulting in a drive unit which is small in size, light in weight, and simple in structure.

Because the optical recording medium is constructed of independently fabricated first and second recording members that are joined to each other, the optical recording medium can be mass-produced much more easily and efficiently than it would be manufactured by the 2P process. The first and second recording members that are joined to each other make the optical recording medium highly mechanically strong. For example, the mechanical strength of the optical recording medium is high when each of the first and second recording members 31, 32 has a thickness of 0.6 mm as well as 1.2 mm. Since the thickness of each of the first and second recording members 31, 32 may be either 0.6 mm or 1.2 mm, the drive unit for use with the optical recording medium may easily be made compatible with disks with the 1.2-mm and 0.6-mm recording members.

The recording tracks 31T, 32T of the first and second information areas 31M, 32M are arranged coaxially with each other. As viewed from the side from which the reproducing light is applied, recording progresses in the same direction along the recording tracks 31T, 32T of the first and second information areas 31M, 32M. The recording track 31T of the first information area 31M extends progressively radially outwardly along the direction in which recording progresses as indicated by the arrow, whereas the recording track 32T of the second information area 32M extends progressively radially inwardly along the direction in which recording progresses as indicated by the arrow. If each of the recording tracks 31T, 32T is of a spiral shape, then information can be recorded and/or reproduced continuously along the recording tracks 31T, 32T. Therefore, the period of time for which information is continuously recorded and/or reproduced can be increased.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

What is claimed is:

1. A method of manufacturing an optical recording medium, comprising the steps of:

separately fabricating a first recording member having a first light-transmissive substrate and a first semi-light-transmissive information area disposed on a surface of said first light-transmissive substrate, and a second recording member having a second substrate and a second reflective information area disposed on a surface of said second substrate; and joining said first recording member and said second recording member to each other with a transparent layer interposed therebetween with the first and second information areas facing each other.

2. A method according to claim 1, wherein said first and second light-transmissive substrates are respectively formed with said first and second information areas by injection molding processes.

3. The method of claim 1, wherein said transparent layer comprises a photosetting transparent resin.

4. A method of manufacturing an optical recording medium, comprising the steps of:

fabricating a first recording member comprising a first substrate having a first information area and a second recording member comprising a second substrate having a second information area by respective injection-molding processes;

forming a reflecting surface on said second information area of said second substrate; and joining said first recording member and said second recording member to each other with a transparent layer interposed therebetween with the first and second information areas facing each other.

5. The method of claim 4, wherein said transparent layer comprises a photosetting transparent resin.

6. A method of manufacturing an optical recording medium, comprising the steps of:

separately fabricating a first recording member having a first light-transmissive substrate and a first semi-light-transmissive information area disposed on a surface of said first light-transmissive substrate, and a second recording member having a second substrate and a second reflective information area disposed on a surface of said second substrate; and joining said first recording member and said second recording member to each other with a transparent layer interposed therebetween with the first and second information areas facing each other, wherein said transparent layer is directly adhered to said first and second information areas.

7. A method of manufacturing an optical recording medium, comprising the steps of:

separately fabricating a first recording member having a first light-transmissive substrate and a first semi-light-transmissive information area disposed on a surface of said first light-transmissive substrate, and a second recording member having a second substrate and a second reflective information area disposed on a surface of said second substrate; and joining said first recording member and said second recording member to each other with a transparent layer interposed therebetween with the first and second information areas facing each other, wherein said first information area has a reflectance ranging from about 20% to about 50%, and a transmittance ranging from about 30% to about 80%, and said second information area has a reflectance of about 60% or higher.

8. A method of manufacturing an optical recording medium, comprising the steps of:

separately fabricating a first recording member having a first light-transmissive substrate and a first semi-light-transmissive information area disposed on a surface of said first light-transmissive substrate, and a second recording member having a second substrate and a second reflective information area disposed on a surface of said second substrate;

joining said first recording member and said second recording member to each other with a transparent layer interposed therebetween with the first and second information areas facing each other; and recording information in said first and second information areas, whereby said information is progressively recorded in said first information area as said optical recording medium is rotated in a first direction, and said information is progressively recorded in said first information area as said optical recording medium is rotated in said first direction.

9. The method of claim 8, wherein said first information area extends progressively radially outwardly, and said second information area extends progressively radially inwardly as said optical recording medium is rotated in said first direction.

10. A method of manufacturing an optical recording medium, comprising the steps of:

fabricating a first recording member comprising a first substrate having a first information area and a second recording member comprising a second substrate having a second information area by respective injection-molding processes;

forming a reflecting surface on said second information area of said second substrate; and joining said first recording member and said second recording member to each other with a transparent layer interposed therebetween with the first and second information areas facing each other, wherein said transparent layer is directly adhered to said first and second information areas.

11. A method of manufacturing an optical recording medium, comprising the steps of:

fabricating a first recording member comprising a first substrate having a first information area and a second recording member comprising a second substrate having a second information area by respective injection-molding processes;

forming a reflecting surface on said second information area of said second substrate; and joining said first recording member and said second recording member to each other with a transparent layer interposed therebetween with the first and second information areas facing each other, wherein said first information area has a reflectance ranging from about 20% to about 50%, and a transmittance ranging from about 30% to about 80%, and said second information area has a reflectance of about 60% or higher.

12. A method of manufacturing an optical recording medium, comprising the steps of:

fabricating a first recording member comprising a first substrate having a first information area and a second recording member comprising a second substrate having a second information area by respective injection-molding processes;

forming a reflecting surface on said second information area of said second substrate;

joining said first recording member and said second recording member to each other with a transparent layer interposed therebetween with the first and second information areas facing each other; and recording information in said first and second information areas, whereby said information is progressively recorded in said first information area as said optical recording medium is rotated in a first direction, and said information is progressively recorded in said first information area as said optical recording medium is rotated in said first direction.

13. The method of claim 12, wherein said first information area extends progressively radially outwardly, and said second information area extends progressively radially inwardly as said optical recording medium is rotated in said first direction.

* * * * *